Patented Sept. 20, 1938

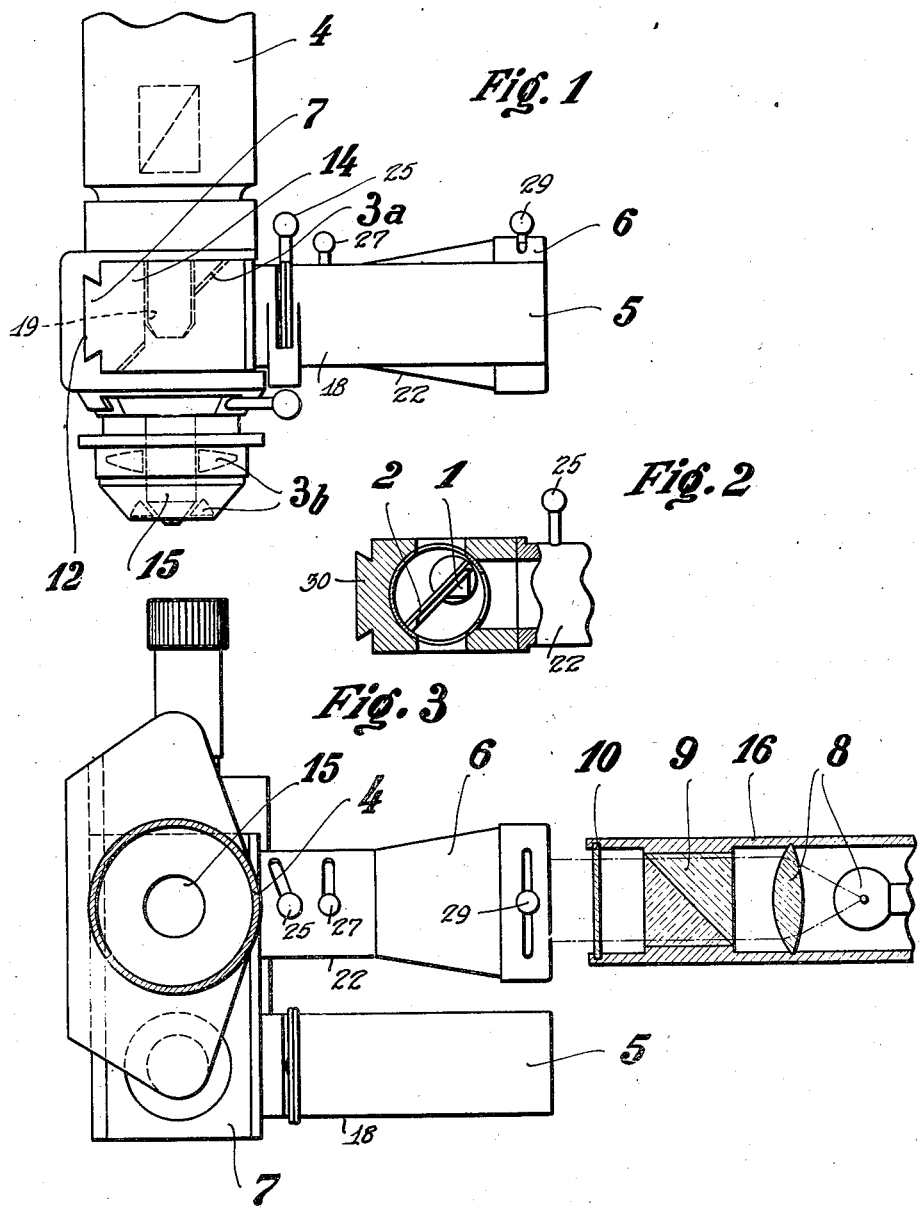

2,130,493

UNITED STATES PATENT OFFICE 2,130,493

ILLUMINATING DEVICE FOR MICROSCOPES

Hermann Heine, Wetzlar, Germany, assignor to Ernst Leitz G. m. b. H., Wetzlar, Germany Application August 3, 1935, Serial No. 34,590
In Germany August 3, 1934

2 Claims. (Cl. 88—40)

This invention relates to improvements in illuminating devices for microscopes with particular reference to a device whereby a ring illuminator may be quickly exchanged with a vertical or opaque illuminator and vice versa without disturbing the centering or adjusted positions of the objective field and the source of light.

A ring illuminator is an illuminating device for indirect illumination of an object on the stage of a microscope. In such a device the light rays pass horizontally from a light source to one side of the microscope to a ring formed inclined plate which reflects the light downwardly through the condenser unit of the microscope in a ring formed bundle of light rays surrounding the objective and to the object. A vertical or opaque illuminator is an illuminating device in which the incoming horizontal light rays are directed toward a reflecting prism or reflecting glass plate which in turn directs the rays downwardly through the objective and to the object which in this case is being illuminated by a circular spot of light. A greater or lesser portion of the rays passes by reflection or diffraction upwards back to the observing eye through the objective and eye piece. Both types of illuminators are per se known to the art. In cases where the object is to be examined under conditions which require the alternate use of both types of illuminators, or where the circumstances are such that several objects are to be examined under different light conditions it is obviously a great advantage to be able to shift from one illuminating device to another without disturbing other elements or factors which enter into the examination.

The object of this invention is to provide means whereby these aims may be accomplished. In the accompanying drawing Fig. 1 is a side view of so much of a microscope equipped with the novel device as is necessary for an understanding of the invention.

Fig. 2 is a detail view diagrammatically illustrating an opaque illuminator with parts in section.

Fig. 3 is a plan view with parts in section and parts broken away.

Referring to Figure 1 the numeral 4 denotes a standard microscope which is provided with a horizontal cut out 14 in which a slide 7 is adapted to be moved, being guided in an undercut guide way 12. Below the cut out 14 the microscope carries the usual lens condenser system 3b which surrounds the objective tube 15. The two illuminators are mounted side by side upon the slide 7 and form therewith a single unit which is movable laterally in the guide way 12 in the transverse cut out 14. The numeral 5 denotes the ring illuminator. It consists of an optical system located within the slide 7 and within a light entrance tube 18 and includes an inclined ring formed reflecting mirror 3a which surrounds a tube 19 which forms a continuation of the microscope 4 when the ring illuminator 5 is moved into optical alinement with the optical axis of the microscope in place of the opaque or vertical illuminator 6 which in Fig. 3 is shown in optical alinement with the microscope tube. In the light entrance tube 18 there is located suitable optical means, not shown, which directs the incoming light rays through the light entrance tube to the mirror 3a from which the light is directed downward through the condenser unit 3b which surrounds the objective tube 15. Obviously this arrangement provides a ringformed beam of illumination hence the name ring illuminator which is known in the art and disclosed in U. S. Patent 1,935,444, Nov. 14, 1933. Also disclosed in pamphlet entitled "Leitz Illuminator: Ultropak", issued by Ernst Leitz, Wetzlar, Germany, November 1931, see page 5.

The opaque or vertical illuminator, a term also well known in the art, is marked with the numeral 6 and comprises an optical system partly within the slide 7 and partly within a light entrance tube 22 secured to the block 7. Within the latter are located an inclined reflecting glass plate 2 and a reflecting prism 1. Within the light entrance tube 22 there is located suitable optical means, not shown, whereby the incoming light rays are controlled in a well known manner for the purpose of the work in hand. The numerals 25, 27 and 29 refer to knobs whereby said optical means within the tube 22 may be manipulated. The opaque or vertical illuminator is shown and described in a pamphlet issued July 1930 by E. Leitz, Inc. of New York entitled "Leitz Vertical Illuminators", see page 3.

Figure 3 also illustrates diagrammatically the illuminating elements which constitute a source of light and which comprises a lamp 8, a polarizer 9 and a filter 10, all suitably supported in a housing or the like 16 of such construction that when the source of light is placed in position it remains centered with respect to the optical axis of the objective tube 15.

With the parts in the positions shown in Figure 3 it is obvious that the microscope is ready for examining an object by or with the opaque illuminator it being then quite clear that the light rays from the light source 8 to the plate 2 and prism 1 from which the rays are reflected downwards through an opening and the objective tube 15 and thence to the object as explained above. Now, when it becomes necessary to change the type of illumination, the slide 7 is moved horizontally across the microscope past the light source thereby displacing the opaque illuminator and placing the ring illuminator in the proper position between the microscope tube and the light. This is clearly indicated in Figure 1. When desired, the slide 7 is again moved back to the position shown in Figure 3. Of course, when shifting from one illuminator to another any suitable stopping device known to the art may be used alining the illuminators with the optical axis of the microscope as will be understood.

It will be noted that with respect to the objective and its field as related to the object on the usual stage, not shown, nothing is disturbed or moved while the type of illumination is changed.

It is apparent that numerous variations are possible, and I contemplate as within the scope of my invention all such modifications and equivalents as fall within the appended claims.

I claim:

1. In combination in a microscope, a microscope tube, an objective tube in optical alinement with the microscope tube, a condensing lens system surrounding the objective tube, a slide, optical means on said slide for directing incoming light rays downward through the objective tube exclusive of the said condensing lens system, said optical means including a downwardly reflecting glass plate and prism, other optical means on said slide in side by side relation to the said named optical means for directing incoming light rays downward through the said condensing lens system exclusive of said objective tube, said other optical means including a tube and an inclined ring-formed mirror surrounding the same, and means on the microscope for supporting the said slide to move transversely of the optical axis of the microscope whereby to selectively place either the said first named optical means or the said named other optical means in operative optical relation with the optical axis of the said objective tube and condensing lens system and a source of light common to the said named optical means.

2. A device according to claim 1 in which the microscope includes a horizontally disposed recess for receiving the said slide and slidably supporting and guiding the same above the said objective tube and above the said condensing lens system.

HERMANN HEINE.